US007509701B2

(12) United States Patent
Wirzberger et al.

(10) Patent No.: US 7,509,701 B2

(45) Date of Patent: Mar. 31, 2009

(54) LIFTING SYSTEM

(75) Inventors: Erich Wirzberger, Neuhuetten (DE); Stephen George Hopper, Cambridgeshire (GB)

(73) Assignee: Bosch Rexroth AG, Stuttgart (DE)

(*) Notice: Subject to any disclaimer, the term of this patent is extended or adjusted under 35 U.S.C. 154(b) by 971 days.

(21) Appl. No.: 10/482,298

(22) PCT Filed: Jul. 4, 2002

(86) PCT No.: PCT/EP02/07437

§ 371 (c)(1),
(2), (4) Date: Feb. 24, 2004

(87) PCT Pub. No.: WO03/010387

PCT Pub. Date: Feb. 6, 2003

(65) Prior Publication Data

US 2005/0029053 A1 Feb. 10, 2005

(30) Foreign Application Priority Data

Jul. 25, 2001 (DE) ................................ 101 36 284
Dec. 21, 2001 (DE) ................................ 101 63 691

(51) Int. Cl.
*B65G 67/60* (2006.01)
*E01D 1/00* (2006.01)

(52) U.S. Cl. ..................................... 14/69.5; 414/139.5

(58) Field of Classification Search .................. 14/69.5, 14/71.1, 71.7; 405/221, 1, 3; 114/258; 119/843-850; 414/139.5
See application file for complete search history.

(56) References Cited

U.S. PATENT DOCUMENTS 2,886,228 A * 5/1959 Susikari ........................ 182/97
4,531,248 A * 7/1985 Swessel et al. ............... 14/71.3
4,862,547 A * 9/1989 Alten ......................... 14/71.1
4,968,182 A * 11/1990 Westwell ..................... 405/215
5,184,914 A * 2/1993 Basta ............................ 405/3
5,378,082 A * 1/1995 Hiller et al. .................... 405/3
5,440,772 A * 8/1995 Springer et al. .............. 14/69.5
5,632,357 A * 5/1997 Matre ......................... 187/200
6,276,016 B1 * 8/2001 Springer ..................... 14/71.1
6,820,295 B2 * 11/2004 Webster ...................... 14/69.5
6,931,686 B2 * 8/2005 Hoofard et al. .............. 14/69.5
2003/0226222 A1 * 12/2003 Stolk .......................... 14/71.1

FOREIGN PATENT DOCUMENTS

DE 33 44 123 C2 6/1985
DE 37 30 363 C1 12/1988
DE 3811225 A1 10/1989
DE 38 40 096 A1 5/1990
DE 39 15 304 C2 11/1990
GB 1 442 983 7/1976

* cited by examiner

*Primary Examiner*—Raymond W Addie
(74) *Attorney, Agent, or Firm*—Oliff & Berridge, PLC

(57) ABSTRACT

What is disclosed is a lifting apparatus, in particular a ferry landing stage, comprising a platform that is capable of being taken into a predetermined lift position with the aid of a hydraulic cylinder or of a cable winch. A safety stop by which the platform may be supported independently of the drive mechanism is associated to the drive mechanism.

11 Claims, 3 Drawing Sheets

LIFTING SYSTEM

The invention concerns a lifting apparatus, in particular a ferry landing stage, comprising a platform which may be taken into a predetermined lift position by means of a drive mechanism.

The like lifting apparatus are employed, e.g., in a ferry landing stage installed on a quai, the platform or ramp (link span) of which is linked to the quai by one end portion thereof while the other end portion is aligned, relative to the floor of the hold of the ferryboat, with the aid of hydraulic cylinders so that the vehicles may move into and out from the ferry. Customarily two parallel hydraulic cylinders are used for rotating and supporting the ramp. Owing to malfunctions in the electrical, mechanical or hydraulic systems, skewing of the ferry landing stage may occur, which in the least favorable case results in breakage of one end of the drive mechanism.

The invention is therefore based on the objective of furnishing a lifting apparatus, in particular a ferry landing stage, wherein a risk of damages is prevented at minimum expense.

This objective is attained by a lifting apparatus having the features of claim 1.

The lifting apparatus of the invention comprises a platform which is capable of being taken into a predetermined lift position by means of a drive mechanism, e.g., a hydraulic cylinder. In accordance with the invention a safety stop acting in parallel with the hydraulic cylinders is associated with the drive mechanism, so that reliable supporting is ensured even in the event of breakage in the drive mechanism.

From the prior art in accordance with DE 38 11 225 A1 a safety stop is known per se, however the latter directly acts on the piston rod of a hydraulic cylinder. In the event of a breakage of a piston rod as described above, however, such a safety stop cannot take effect, for which reason it dos not satisfy the safety requirements to be underlaid, e.g., for ferry landing stages.

In a particularly preferred variant of the invention, the safety stop is designed to include a stop rod capable of being connected to the platform via clamping means similar to those of DE 38 11 225 A1. I.e., in the event of irregular movement of the hydraulic cylinders or of some other hazard, the lifting apparatus engages the clamping means so that the platform may be decelerated and immobilized independently of the drive mechanism.

Here it is particularly preferred if the clamping device has a clamping cylinder through which the stop rod extends and in which clamping members are guided in a slidable manner, which clamping members are hydraulically biased into a release position and may be taken into clamping engagement with the stop rod.

Operational safety of the lifting apparatus of the invention may be further improved if the clamping members are received in a clamping piston which is accommodated in the clamping cylinder in an axially slidable manner. In accordance with the invention, the clamping piston is hydraulically biased into a basic position. In the event of a hazard to the lifting apparatus, the clamping device is engaged and moves against the hydraulic biasing pressure. Through a defined stopping distance the kinetic energy of the lifting apparatus is neutralized without any damage to the entire installation.

This maximum pressure is preferably limited with the aid of a pressure control valve through which the cylinder space may be connected to a tank.

The clamping members of the clamping means are, preferably by hydraulic means, biased into their release positions, such biasing being obtained with the aid of one or several actuating pistons guided in the clamping piston, the rear face(s) of which is/are subjected to an actuation pressure.

It is particularly advantageous if this actuation pressure corresponds to the pressure acting on the entrance side of the pressure control valve.

Driving the clamping members, i.e. engaging the clamping members, is achieved by switching a switching valve whereby the tank pressure may be applied to the rear faces of the actuating pistons for engagement, so that the clamping members are moved mechanically, such as by the force of a spring, into their clamping positions.

In a particularly preferred embodiment, a path measuring system is associated to the safety stop, whereby the path and the velocity of movement of the clamping cylinder relative to the stop rod may be detected. When the detected signals exceed predetermined limit values, the safety stop is driven, so that the clamping members engage and the platform is braked.

The pressure for operability of the safety stop is advantageously built up with the aid of a pump associated with a hydraulic reservoir in the system. This has the purpose of avoiding pressure peaks when the safety stop responds.

In a particularly compact variant, the above described hydraulic components and/or a pressure medium tank are integrated into the housing of the clamping cylinder or flange-mounted on the latter.

Other advantageous developments of the invention are subject matters of the further subclaims.

Hereinbelow a preferred embodiment the invention shall be explained in more detail by referring to schematic drawings, wherein.

Figure 1:
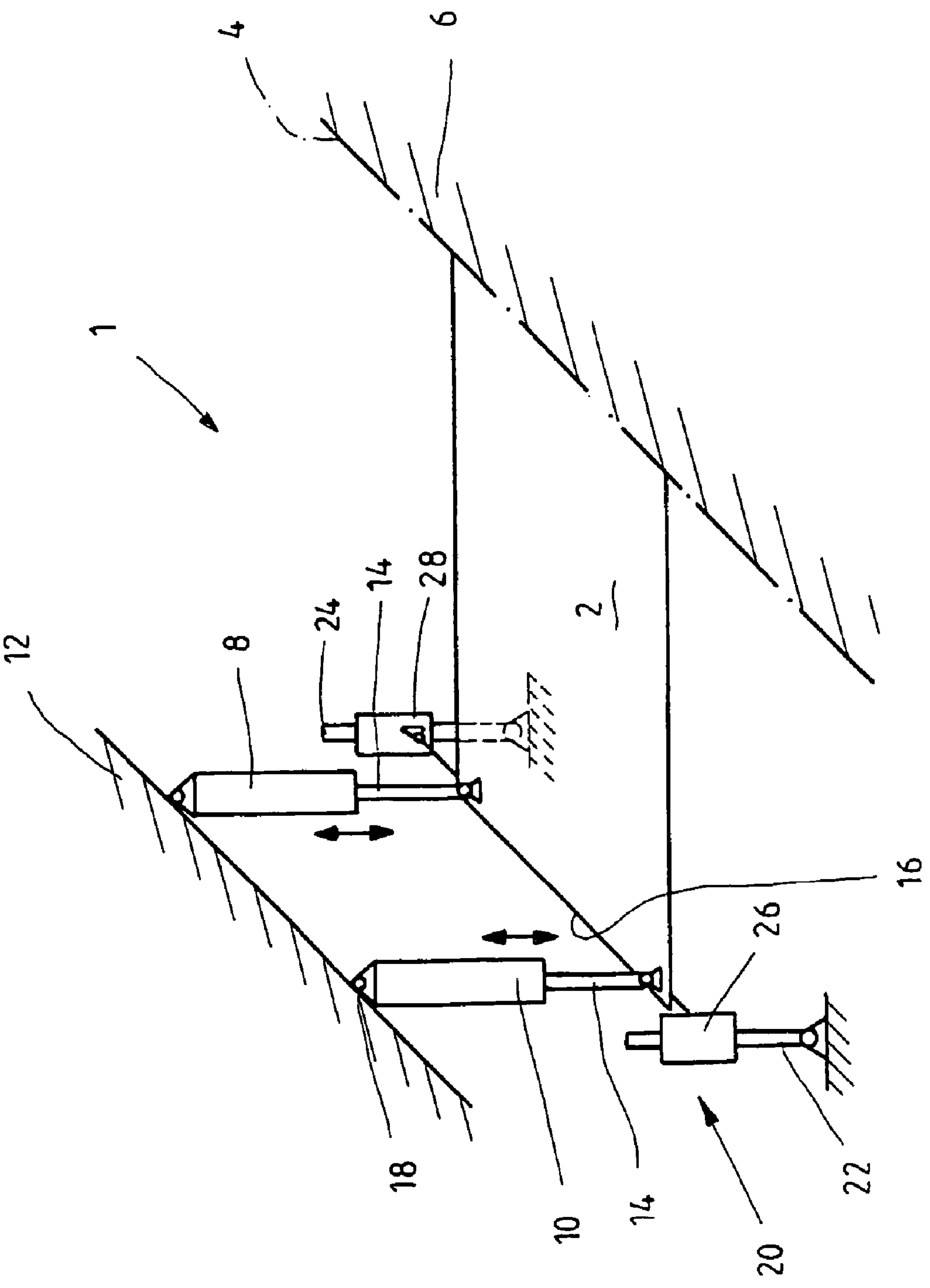
FIG. 1 is a schematic representation of a ferry landing stage.

In FIG. 1 the basic principle of a conventional ferry landing stage 1 is represented. It includes a platform, in the following referred to as ramp 2, which is mounted on a quai 6 of the ferry landing stage 1 through a pivotal articulation 4 indicated in dash-dotted line. On the end portion of the ramp 2 removed from the quai 6, two hydraulic cylinders 8, 10 attack which are supported on a support frame 12 which is only represented in schematic outline. In the represented variant the two hydraulic cylinders 8, 10 have a suspended arrangement, with their piston rods 14 accordingly being subjected to tensile stress. Mounting the hydraulic cylinders 8, 10 on the support frame 12 is achieved with the aid of suitable suspensions 18 that allow a rotation of the hydraulic cylinders 10 so as to balance the trajectory of the platform 2. Instead of the suspended arrangement of the hydraulic cylinders 8, 10 it is, of course, also possible to choose a standing arrangement in which the hydraulic cylinders are subjected to compressive stress. By retracting and extending the piston rods 14 it is possible to rotate the ramp 2 and thus align the front edge 16 relative to the level of a hold of a ferryboat, so that vehicles may get onto the ferryboat via the ramp 2.

Insofar the represented ferry landing stage 1 corresponds to conventional solutions. If, now, breakage of one of the piston rods 14 occurs owing to skewing, then the ramp 2 may crash in an uncontrolled manner or at least be badly damaged by the torsional forces involved.

In order to prevent such damages to the platform 2, a safety stop 20 by which the platform 2 may be braked and supported independently of the action of the hydraulic cylinders 8, 10 is associated with the hydraulic cylinders 8, 10. In the represented embodiment the safety stop 20 consists of two stop rods 22, 24 supported on the ground side and each extending through one clamping cylinder 26, 28 which is capable of being taken into clamping engagement with the stop rods 22, 24. This safety stop 20 shall in the following be explained in more detail by referring to FIGS. 2 and 3 which show the stop rod 22 and the clamping cylinder 26 cooperating with it.

Figure 2:
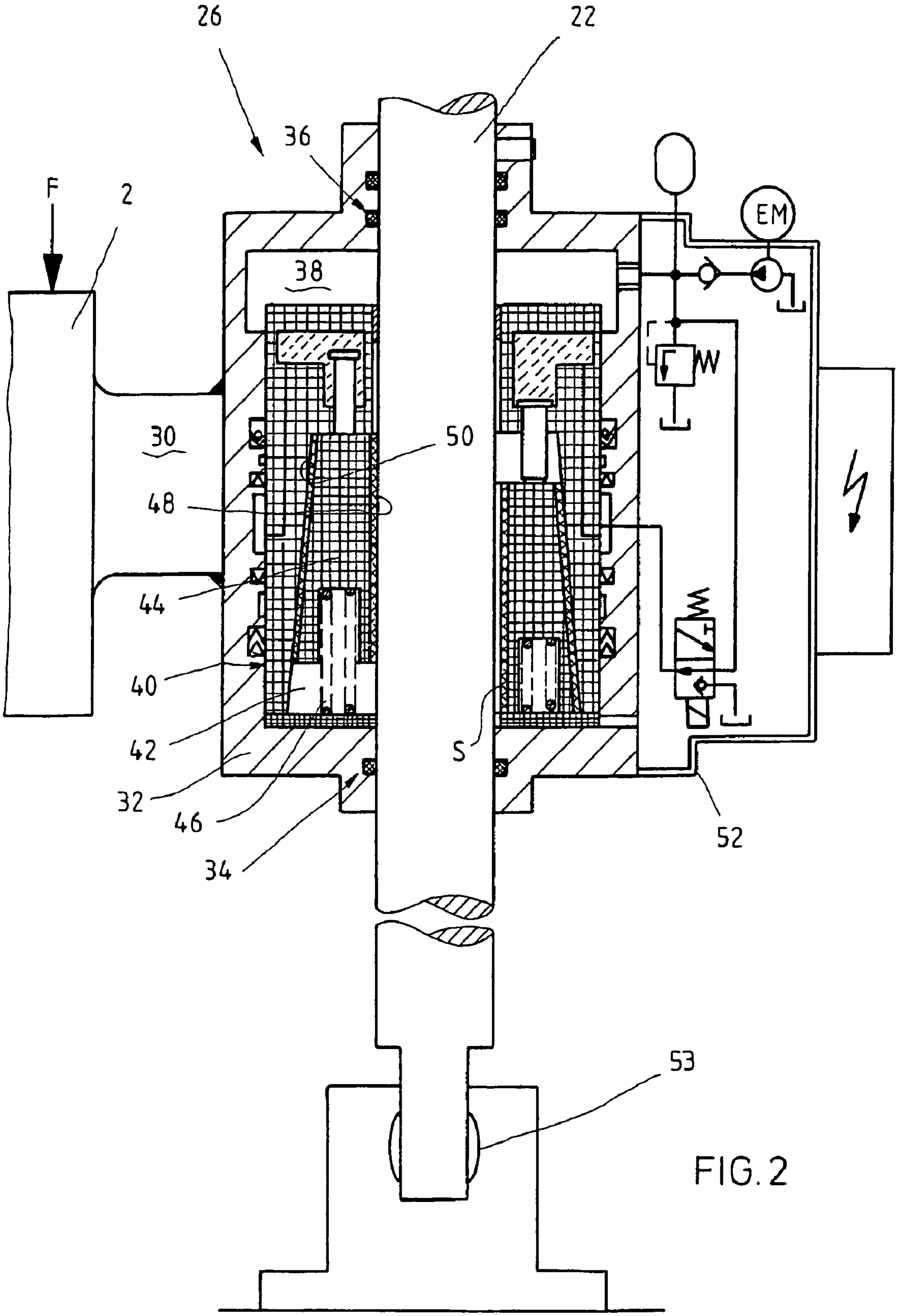
FIG. 2 is a safety stop of the ferry landing stage of FIG. 1.

In accordance with FIG. 2, the clamping cylinder 26 is connected to the ramp 2 via a connecting arm 30 by means of an articulation. The clamping cylinder has a cylinder housing 32 through which the stop rod 22 extends. Inside the cylinder housing slideways and seal means 34, 36 are arranged, whereby the cylinder space 38 is sealed against the outside.

In the cylinder housing 32 a clamping piston 40 is guided in an axially slidable manner, which clamping piston is biased into a lower stop position by the pressure in the cylinder space 38 located on top in FIG. 2. As will be explained in more detail hereinbelow, the clamping piston has a conical inner space 42 in which several clamping members 44 distributed on the circumference are guided. In the represented embodiment, the conical inner space 42 tapers upwardly. The geometry of the clamping members 44 correspondingly is cuneiform (cross-section in accordance with FIG. 2). The clamping members 44 are biased upwardly with the aid of engaging springs 46 into their engaging positions (left half in FIG. 2) in which their inner friction surfaces 48 contact the outer circumference of the stop rod 22, and their external, obliquely inclined friction surfaces 50 contact the inner peripheral wall of the conical inner space 32. Thanks to the clamping forces of the clamping members 44 acting as a result of the wedge angle, it is possible to transmit considerable radially acting braking forces to the stop rod 22, however under the condition that the stop rod 22 is acted on in the direction of the force F. In the opposite direction the transmittable braking force is considerably lower, for it is then essentially determined by the force of the engaging springs 46.

As is represented on the right side in FIG. 2, the clamping members 44 are hydraulically taken—against the force of the engaging springs 46—into a,basic position wherein an air gap S exists between the inner friction surface 48 and the outer circumference of the stop rod 22, so that no braking force whatsoever is transmitted.

The hydraulic components for driving the clamping cylinder 26 are essentially integrated into a secondary housing 52 fastened on the cylinder housing 32 or formed in the latter.

In the described embodiment, the stop rods 22 have a standing arrangement. As the clamping cylinder 26 is fixedly connected with the platform 2, the stop rods 22 have to be supported on the quai wall or an a dolphin with the aid of a support bearing 53, so that the clamping cylinder 26 may be moved along the stop rod 22 without any jamming.

Figure 3:
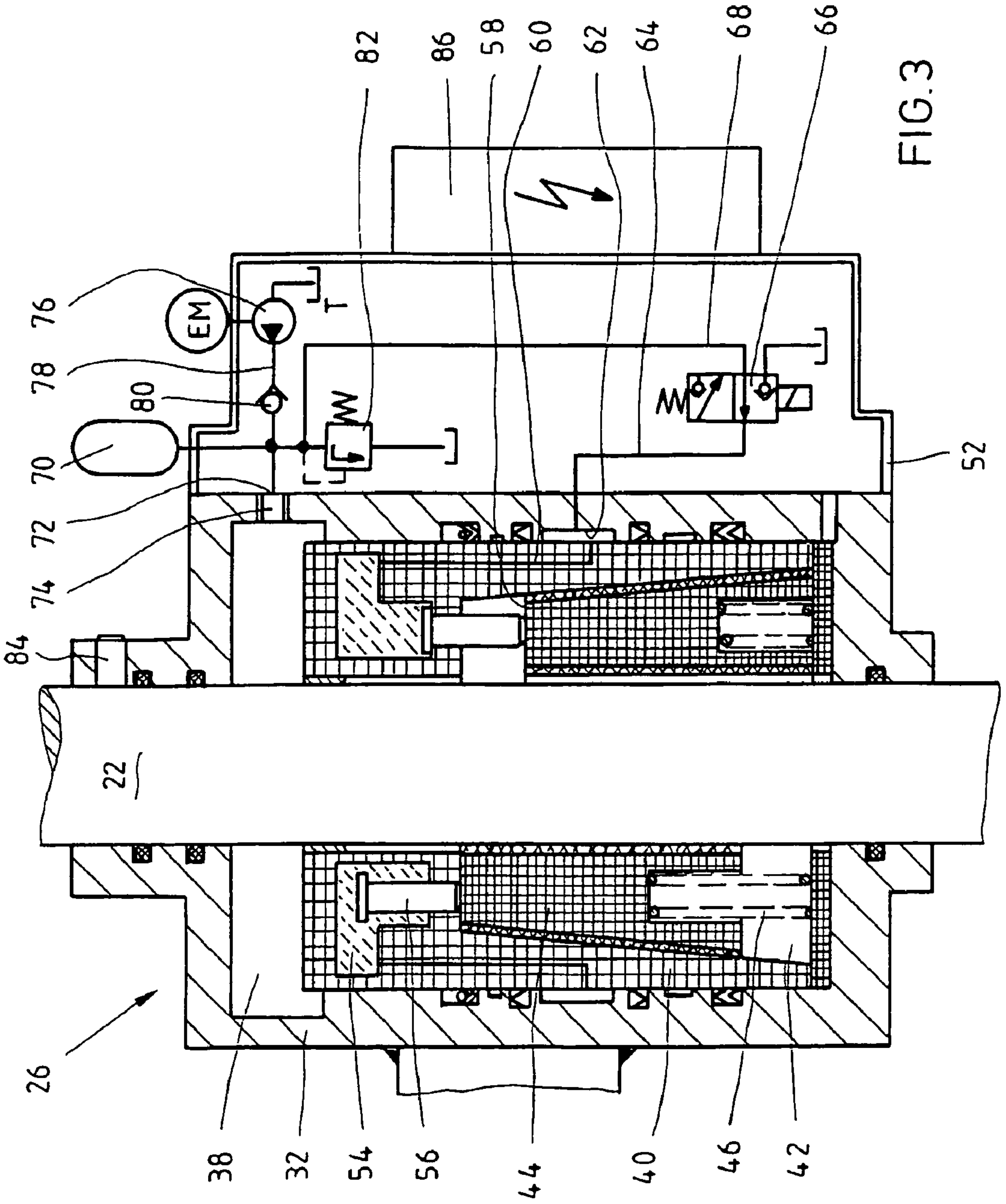
FIG. 3 shows a detail of the safety stop of FIG. 2.

The hydraulic components of the clamping cylinder 26 shall be explained in more detail by referring to FIG. 3.

As is evident from the representation on the right side in FIG. 3, the clamping piston 40 includes an actuation space 54 through which pressure medium may be applied to one or several actuating pistons 56. The end portions of the actuating pistons 56 that are removed from the actuation space 54 project into the inner space 42 of the piston 40 accommodating the clamping members 44 and contact the adjacent small end face portions 58 of the clamping member(s) 44. The actuation space 54 communicates via a passage 60 with an annular groove 62 formed in the inner peripheral wall of the cylinder housing 32. The annular groove 62 is connected to a terminal of an electrically operated switching valve 66 via a connection passage 64. This switching valve 66 is connected to a control 86 of the ferry landing stage 1. The clamping piston 40 is sealed by suitable seal means in the cylinder housing 32, so that the cylinder space 38 is hydraulically separated from the space accommodating the engaging springs 46.

In the represented basic position of the switching valve 66, which is reached, by driving a switching solenoid, the connection passage 64 communicates with a pressure passage 68 leading to a hydraulic reservoir 70. For switching, the switching solenoid is deactivated, so that the switching valve 66 is taken by the force of a compression spring into its second switching position wherein the connection passage 64 is connected with the tank.

From pressure passage 68 a line 72 branches off which leads to a radial port 74 of the cylinder space 38. In other words, the pressure in the hydraulic reservoir 70 also acts on the end face of the piston located on top in FIG. 3. The hydraulic reservoir 70 may be charged with the aid of an electrically operated pump 76, the pressure line 78 of which is connected with the pressure passage 68 via a check valve 80. By means of the pump 76, pressure medium is sucked from a tank T which may be integrated in the secondary housing 52.

The pressure in the pressure passage 68 may be limited to a predetermined maximum pressure with the aid of a pressure control valve 82. When this maximum pressure is exceeded, the pressure passage 68 is connected to the tank T through the pressure control valve 82.

As is moreover evident from FIG. 3, a path measuring system 84 allowing to detect the position of the clamping cylinder 32 relative to the piston rod 22 and the relative velocity is integrated into the cylinder housing 32. Such an absolute path measuring system is described, e.g., in EP 0 618 373 B1, so that further explanations may accordingly be omitted.

As is moreover indicated in FIG. 3, laterally on the secondary housing 52 the control 86 is arranged, in which the output signals of the path measuring system 84 are processed and the above described hydraulic components, in particular the switching valve 66, are driven.

During normal operation of the ferry landing stage, for example during retraction of the hydraulic cylinders 8, 10 for lifting the ramp 2, the switching valve 66 is in its basic position represented in FIG. 3, so that the clamping members 44 are biased against the force of the engaging springs 46 into their disengaging positions by the pressure acting in the actuation space 54—the stop rod 22 may move freely. The pressure in the actuation space 54 is also applied in the cylinder space 38 via line 72 and port 74. This biasing pressure advantageously has such an amount that the maximum possible static load of the ramp (including the load located on it) may be absorbed immediately when the safety stop intervenes, i.e., this pressure is selected to be so high that the clamping piston 40 will remain in its represented lower stop position upon a quasi-static engagement of the safety stop. The limit pressure set at the pressure control valve 82 is about 1.1 to 1.3 times higher than the biasing pressure.

For the sake of completeness it should be mentioned that a path measuring system 84 is integrated in each one of clamping cylinders 26, 28. In the case of a nonuniform movement of the two hydraulic cylinders 8, 10, different position and velocity signals are output by the two path measuring systems 84 of clamping cylinders 26, 28. When a predetermined limit value is exceeded, an actuation signal is emitted by the control 86 to the switching valve 66, so that the latter is switched by the force of its compression spring into the other switching position in which the connection passage 64 is connected with the tank T. I.e., the pressure in the actuation space 54 is relieved towards the tank T; the clamping members 44 may then be shifted into their engaging positions (on the left in FIG. 3) through the force of the engaging springs 46, so that stop rod 22 (24) is frictionally coupled with the associated clamping cylinder 26 (28)—the platform is braked and reliably retained.

When the brake is being engaged, the pressure in the cylinder space 38 prevents further acceleration of the load. Owing to the dynamic load, the clamping piston 40 moves into the cylinder space 38. This results in a pressure rise in the cylinder space 38, bringing about a deceleration of the load to a final standstill.

In order to prevent an overload on the ramp 2, the pressure in the cylinder space 38 is limited to a maximum pressure with the aid of the pressure control valve 82. When this pressure is exceeded, the pressure medium in the cylinder space 38 is relieved towards the tank.

The hydraulic reservoir 70 is designed to have a comparatively large volume, so that pressure peaks during the deceleration process may be attenuated. The system is designed such that the maximum braking force may be applied within about 100 msec. For the purpose of limiting the braking force to the maximum value, a quick response of the pressure control valve 82 is necessary. In order to be able to realize the time for building up the maximum braking effect, it is necessary for the pressure control valve 82 to completely open the connection towards the Tank T within approximately 5 msec.

In the embodiment represented in FIG. 1, the safety stop 20 is designed to include two stop rods 22, 24 and two clamping cylinders 26, 28. In cases of lower requirements a single safety stop may, of course, also be sufficient.

Instead of the standing arrangement of the stop rods 22, 24 it is, of course, also possible to choose a suspended arrangement in kinematic reversal.

In the above described embodiment, hydraulic cylinders 8, 10 are employed for rotating the platform 2. Instead of these hydraulic cylinders it is also possible to use other drive mechanisms, e.g. cable winches, spindles, etc.

What is disclosed is a lifting apparatus, in particular a ferry landing stage, comprising a platform that is capable of being taken into a predetermined lift position with the aid of at least one drive mechanism. A safety stop by which the platform may be supported independently of the drive mechanism is associated to the drive mechanism.

The invention claimed is:

1. A lifting apparatus, in particular a ferry landing stage, comprising a platform which may be taken into a predetermined lift position by means of a drive mechanism and a safety stop acting in parallel with the drive mechanism so that the platform may be supported independently of the drive mechanism;

wherein the safety stop has a stop rod capable of being connected with the platform through clamping means, the clamping means including a clamping cylinder through which the stop rod extends, and the clamping members being guided in a slidable manner, which clamping members may be taken into clamping engagement with the stop rod and are hydraulically biased into a release position.

2. A lifting apparatus in accordance with claim 1, wherein the drive mechanism has at least one hydraulic cylinder or one cable winch.

3. The lifting apparatus in accordance with claim 1, including a path measuring system whereby position and velocity of a clamping cylinder relative to the stop rod may be detected.

4. The lifting apparatus in accordance with claim 1, wherein a pressure medium tank is integrated into the clamping cylinder or flange-mounted on the latter.

5. The lifting apparatus in accordance with claim 1, wherein the clamping members are received in a clamping piston which is slidably accommodated in the clamping cylinder, which clamping piston jointly with the clamping cylinder defines a cylinder space that is connected to a pressure medium source and may be subjected to a biasing pressure.

6. The lifting apparatus in accordance with claim 5, wherein the pressure medium source is a pump to which a hydraulic reservoir is associated.

7. The lifting apparatus in accordance with claim 5, wherein the cylinder space may be connected to a tank via a pressure control valve.

8. The lifting apparatus in accordance with claim 5, wherein the clamping members are biased into their release positions through at least one actuating piston, the actuating piston being guided in the clamping piston, and the rear face of the actuating piston being subjectable to an actuation pressure.

9. The lifting apparatus in accordance with claim 7, wherein the pressure control valve is set to a pressure which is 1.1 to 1.3 times the biasing pressure.

10. The lifting apparatus in accordance with claim 8, including a switching valve whereby the actuation pressure or the tank pressure may be applied to the rear face of the actuating piston.

11. The lifting apparatus in accordance with claim 10, wherein the switching valve may be driven in accordance with the signal of a path measuring system.

* * * * *